(12) United States Patent
Lehmann

(10) Patent No.: US 6,557,395 B2
(45) Date of Patent: May 6, 2003

(54) METHOD AND APPARATUS FOR LEAK TESTING CLOSED CONTAINERS

(76) Inventor: Martin Lehmann, Obere Farnbühlstrasse 1, CH-5610 Wohlen 1 (CH)

(*) Notice: Subject to any disclaimer, the term of this patent is extended or adjusted under 35 U.S.C. 154(b) by 0 days.

(21) Appl. No.: 10/207,148

(22) Filed: Jul. 30, 2002

(65) Prior Publication Data

US 2002/0178793 A1 Dec. 5, 2002

Related U.S. Application Data

(62) Division of application No. 09/669,669, filed on Sep. 26, 2000, now Pat. No. 6,439,032.

(51) Int. Cl.⁷ .......................... G01M 3/36; G01M 3/16; G01M 3/32
(52) U.S. Cl. .............. 73/49.3; 73/52; 73/45.4
(58) Field of Search ................ 73/49.3, 49.2, 73/45.4, 52

(56) References Cited

U.S. PATENT DOCUMENTS

| | | | |
|---|---|---|---|
| 3,837,215 A | 9/1974 | Massage | 73/45.4 |
| 4,107,997 A | 8/1978 | Snaper | 73/304 R |
| 4,449,396 A | 5/1984 | Bzdula | 73/61.1 R |
| 4,649,740 A | 3/1987 | Franklin | 73/49.3 |
| 4,715,215 A | 12/1987 | Perhach et al. | 73/49.3 |
| 4,747,299 A | 5/1988 | Fox et al. | 73/49.3 |
| 4,756,184 A | 7/1988 | Reishus et al. | 73/49.3 |
| 4,771,630 A | 9/1988 | Croce et al. | 73/49.3 |
| 4,862,732 A | 9/1989 | Raymond et al. | 73/45.4 |
| 4,930,345 A | 6/1990 | Bausch | 73/45.4 |
| 4,955,226 A | 9/1990 | Beaty et al. | 73/49.3 |
| 5,105,654 A | 4/1992 | Maruyama et al. | 73/49.3 |
| 5,195,360 A | 3/1993 | Knigge | 73/49.3 |
| 5,528,925 A | 6/1996 | Sherepa et al. | 73/41 |
| 5,533,385 A | 7/1996 | Frevalt | 73/49.3 |
| 5,542,288 A | 8/1996 | Fenlon | 73/49.3 |
| 5,767,392 A | 6/1998 | Belcher et al. | 73/41 |
| 5,915,270 A | 6/1999 | Lehmann | 73/49.3 |
| 5,962,776 A | 10/1999 | Lehmann | 73/49.3 |
| 6,082,184 A * | 7/2000 | Lehmann | 73/49.3 |
| 6,202,476 B1 | 3/2001 | Fenlon | 73/49.3 |

FOREIGN PATENT DOCUMENTS

| | | |
|---|---|---|
| EP | 0 619 015 B1 | 10/1997 |
| FR | 76 13948 | 9/1977 |
| GB | 2 059 381 A | 4/1981 |
| WO | 97/26521 | 7/1997 |

* cited by examiner

*Primary Examiner*—Daniel S. Larkin
*Assistant Examiner*—David J. Wiggins
(74) *Attorney, Agent, or Firm*—Antonelli, Terry, Stout & Kraus, LLP

(57) ABSTRACT

Leak testing a closed container with at least one flexible wall area is performed with the method and apparatus wherein a biasing arrangement compresses or expands the container under test. A biasing force is monitored with a force detector applicable to the wall of the container. The force detector generates an electric output first biasing force signal at a first point in time which is stored for comparison with the monitored biasing force signal at a second subsequent point in time to generate a different signal as a leak indicative signal. A difference signal is generated at the first point in time from the first force measuring signal stored and the first force measuring signal. This latter difference signal is stored as a zero offset signal which is used to compensate zero offset of the generated difference signal.

38 Claims, 9 Drawing Sheets

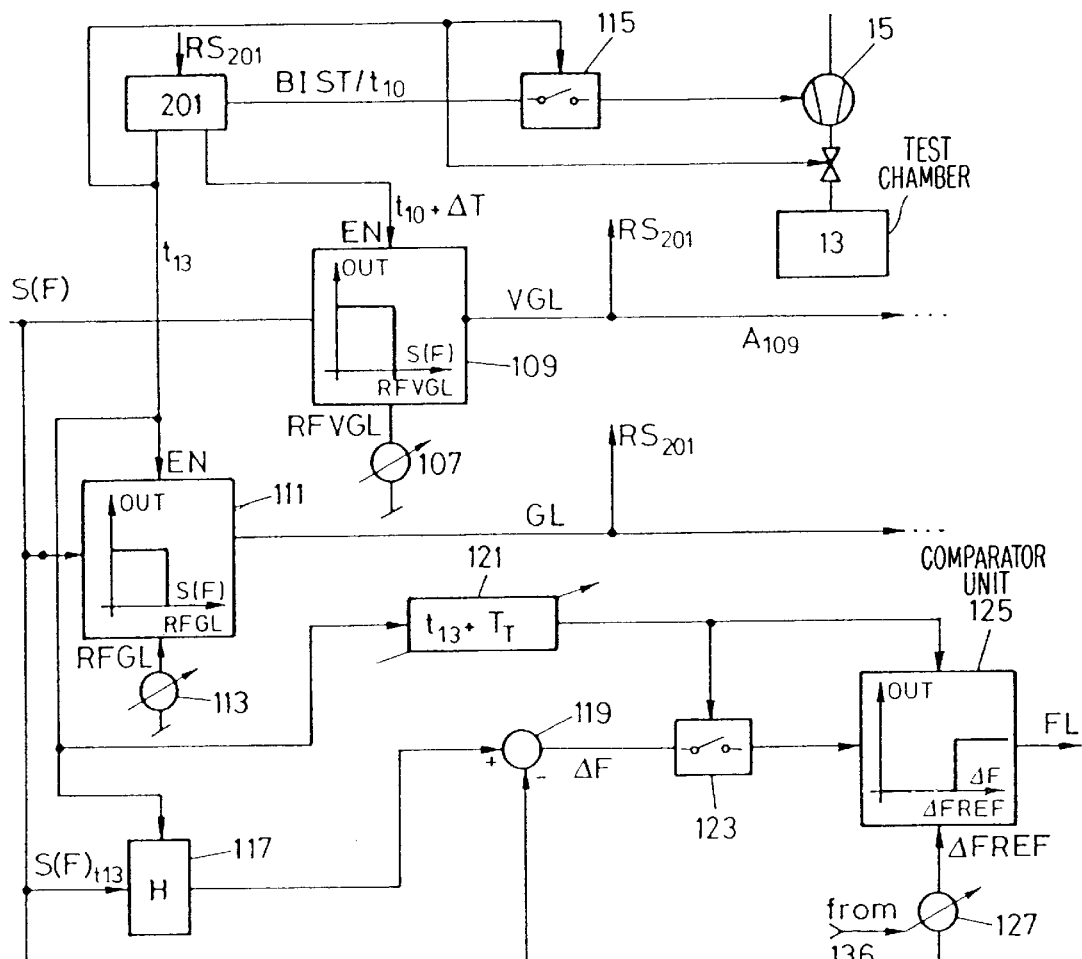
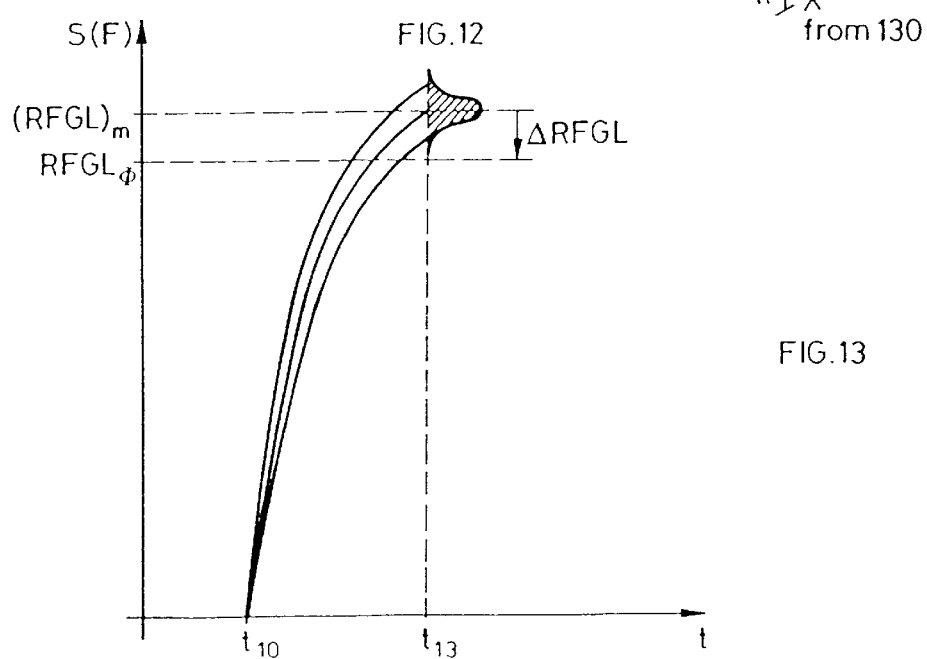
FIG. 12
FIG. 13

METHOD AND APPARATUS FOR LEAK TESTING CLOSED CONTAINERS

RELATED APPLICATION

This application is a divisional application of U.S. application Ser. No. 09/669,669, filed Sep. 26, 2000 now U.S. Pat. No. 6,439,032 Aug. 27, 2002.

TECHNICAL FIELD

The present invention is directed to a method for leak testing closed containers with at least one flexible wall area and to a leak testing apparatus for leak testing a closed container with such flexible wall area, irrespective whether such container is filled with a product or not.

BACKGROUND

When testing closed containers one known technique is to arrange a container to be tested into a test cavity which is then sealingly closed, then to evacuate the interior space of the test cavity around the container to be tested and to evaluate the time behaviour of the pressure in the surrounding of the container after evacuation has been stopped at a predetermined level. Although this technique is of very high accuracy it necessitates utmost care for reaching such high accuracy. The volume of the test cavity and its shape must snugly fit the outside shape of the container to be tested. On one hand minimising this volume leads to respectively short evacuation time, on the other hand the degree of this minimising largely governs the detection accuracy reached. As a change in pressure in the surrounding of the container is detected as leak indication entity, the smaller than the volume is in which, through a leak, pressure is affected, the higher will be the detection accuracy.

Further, accuracy is largely influenced by the degree of vacuum which is established in the surrounding of the container, which makes it necessary, for high accuracy, to provide relatively expensive vacuum pumps, possibly even multiple stage vacuum pumps, if vacuum is to be established down to the level as only reached with turbo vacuum pumps.

SUMMARY

It is an object of the present invention to provide for a method and apparatus as mentioned above, which remedies for the drawbacks of state of the art leak testing technique using pressure monitoring. This object is resolved by the method of leak testing as mentioned above, comprising the steps of relatively moving a biasing member towards and onto the flexible wall area of the container, stopping such moving and monitoring a biasing force on said container. The biasing force monitored is sampled at a first point in time resulting in a first force measuring signal and is sampled at least one second subsequent point in time, resulting in a second force measuring signal. There is further generated a difference signal in dependency of said two measuring signals as a leak indicative signal.

Thereby, the present invention departs from the recognition that if a container to be tested is biased, leading to either compression or expansion of such container, biasing forces will apply to surfaces applied externally to the wall of the container as reaction forces of the expanded or the compressed container. Such reaction forces may easily be monitored. If such biasing is installed to a predetermined level and then stopped, a tight container will lead to monitoring a constant reaction force according to the biasing level reached. If the container is leaky, there will occur an exchange of medium between the surrounding of the container and its inside, leading to a decrease of the reaction force monitored over time.

Thereby, the accuracy of such a technique is largely independent from the volume surrounding the container under test, and is further primarily given by the degree of biasing and the force detecting surface towards which the biased container reacts.

In a preferred embodiment of the inventive method, biasing is installed up to a predetermined biasing force.

Having reached such predetermined biasing force, it is further proposed to wait for a time span before by sampling the respective first and second force measuring signals are generated, in dependency of which the difference signal is generated. Thereby, in this time span the biased container can stabilise its shape. In one operating embodiment biasing of the container under test is controlled as a function of the difference signal generated, so as to hold said difference signal on a predetermined value and exploiting the action of the biasing member as a leak indication. Thereby, a negative feedback loop is established, where the biasing member controllably counteracts a change of force monitored due to leakage, so that in extreme no change of force will occur due to the fact that the biasing member maintains by appropriate action a constant reaction force.

In a most preferred embodiment biasing the container is not established by relatively moving external surfaces onto the wall of the container, but in that a pressure difference is installed between the inside of the container and its surrounding. Thereby, the pressure difference is in a most preferred embodiment established by evacuating the surrounding of the container. The flexible wall area of the container has then the tendency of bowing outwards, and if this bowing outwards is barred by stationary surfaces outside the container, the container will act with a respective force on such surfaces. This force is monitored.

So as to avoid that due to the inventively exploited biasing, an existing leak in a container is clogged by the wall area with such leak being urged onto an external surface, it is proposed to provide surface areas contacted by the wall of the container, as it is biased, with a structure. Such a structure may be realised by interposing a mesh- or grid-like member between wall area of the container and such an external surface or, and preferably, by roughening such surface as by etching or machining.

In a further preferred embodiment the first force measuring signal is stored and the difference signal is generated in dependency of the stored first force measuring signal and the second measuring signal.

In a further preferred mode of operation, already in the first point in time there is generated the difference signal namely from the first force measuring signal stored, and the first force measuring signal unstored. The resulting difference signal, as a zero offset signal, is stored and zero offset of latter generated difference signal is compensated by the stored zero offset signal.

So as to early detect large leaks, then smaller leaks, it is further proposed to compare the biasing force monitored with at least one predetermined threshold value, at the latest when sampling at said first point in time, which leads to identifying very large leaks and further preferably to compare the difference signal with at least one predetermined threshold value.

The leak testing apparatus according to the present invention comprises a biasing arrangement for compressing or expanding a container under test, further a force detector applicable to the wall of the container under test and generating an electric output signal. The output of the force detector is operationally connected to a storing unit, the output of the storing unit operationally connected to a comparator unit. The second input of the comparator unit is operationally connected to the output of the force detector.

The invention is especially suited for leak testing so-called pouches, all around flexible wall containers, filled e.g. with pasty material.

Further preferred forms of realising the inventive method and the inventive apparatus will be become apparent to the skilled artisan reading the following detailed description as well as the claims.

BRIEF DESCRIPTION OF DRAWINGS

By way of examples the following figures show:

FIG. 12 by means of a signal flow/functional block diagram the embodiment of the inventive apparatus performing measurements as explained with the help of the FIGS. 11a to 11c;

FIG. 13 a force signal versus time diagram showing the statistic distribution of biasing force reached after a predetermined time of biasing at unleaky containers of the same type due e.g. to manufacturing tolerances;

DETAILED DESCRIPTION

Figure 1:
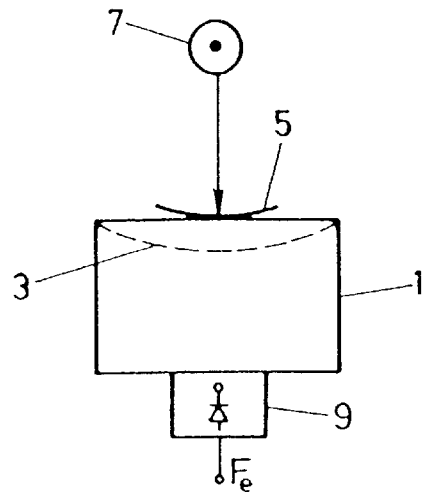
FIG. 1 schematically, a first embodiment of an inventive apparatus operating according to the inventive method, whereat a container under test is biased by compression, biasing member and force detector being arranged on opposite sides of the container.
Figure 2:
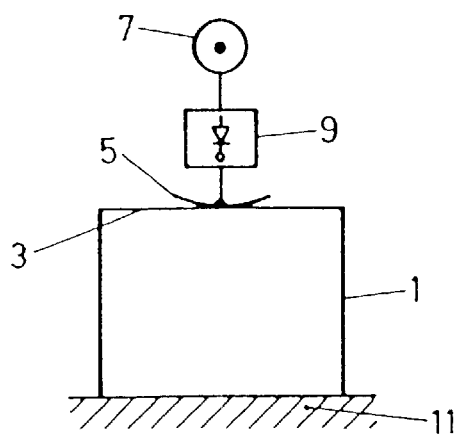
FIG. 2 in a representation according to FIG. 1, an embodiment whereat the container resides on a support and biasing member as well as force detector are arranged on the opposite side of such support.

FIG. 1 shows schematically one principle according to the present invention. A container to be leak tested, 1, has an area of its wall 3 which is flexible. The principle of the present invention resides in the fact that for leak testing container 1 a biasing member 5 is moved by means of a drive 7 towards and onto the wall of the container 1 and a force detector 9 monitors the reaction force F and generates an electrical signal $F_{e1}$ according to that force F. As shown in FIG. 2 in a preferred mode the force detector 9 is directly coupled to the biasing member 5 and both are driven relative to and onto the flexible area 3 of the wall of the container 1, which latter resides, e.g., on a base plate 11.

Figure 3:
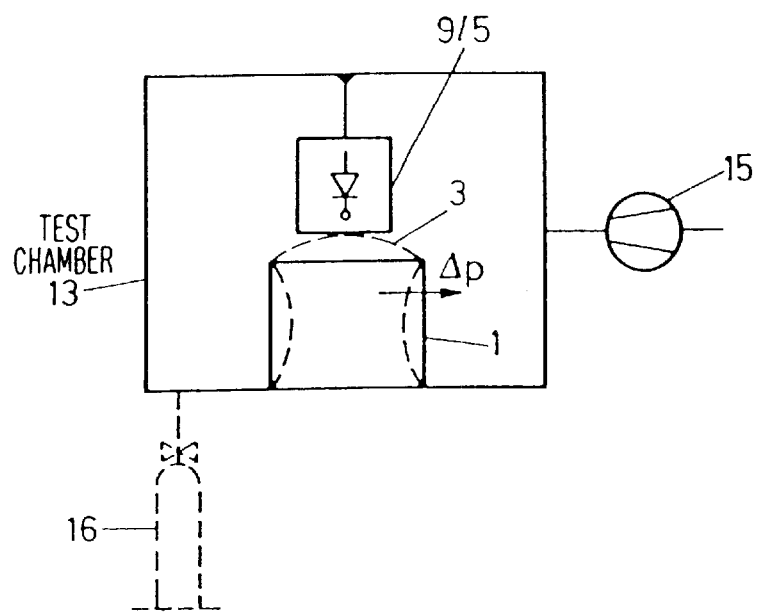
FIG. 3 in a schematic representation according to those of FIGS. 1 and 2, a further and preferred embodiment of the inventive apparatus and method, where at biasing the container is realised by evacuating the surrounding of the container under test.

In a still further preferred embodiment and as shown in FIG. 3 the drive 7, which moves one of the biasing member 5, of force detector 9 or of a combined force detector and biasing member 5/9 arrangement with respect to the flexible area 3 of the wall of container 1, is in fact realised as a pneumatic drive. Force detector 9 and biasing member 5 are kept stationary in a test chamber 13.

By means of an evacuation pump 15 the test chamber 13 is evacuated, thereby generating a pressure difference Δp between the surrounding of the container 1 and its interior, which is directed from the inside to the outside of the container. Thereby, the flexible wall portion 3 is bent outwards and moved towards and onto the force detector 9, which here and as a preferred embodiment simultaneously acts as biasing member and as force detector. As shown in dotted lines, it is also possible to pressurise the container 1 e.g. with a source 16 of pressurised gas, and dependent on the wall structure of container 1, to have area 3 bowing outwards.

Irrespective of the technique, which is inventively exploited and with respect to where the biasing member 5, where the force detector 9 are arranged and how the drive 7 is realised, as a mechanical drive as shown in FIG. 1 or 2 or by a pressure difference applied as shown in FIG. 3, biasing container 1 by relatively moving biasing member 5 towards and onto container 1 leads to force detector 9 detecting a rising force F as the container 1 is urged together in the embodiments according to FIG. 1 or 2 or is expanded according to the preferred embodiment of FIG. 3. According to FIG. 4, as soon as biasing member 5 contacts the wall $t_0$ of container 1, the reaction force F rises as biasing member 5 is further urged onto the wall of container 1. After a predetermined time $t_1$ the relative movement of container wall 1 and biasing member 5 is stopped. This leads to a constant reaction force $F_o$, if the container is unleaky and its wall does not further react up to achieving equilibrium of shape.

If the container under stress has a large leak LL according to course (b), then the biasing movement of the biasing member will not lead to a reaction force F achieving $F_o$ at all, but after the time span according to $t_1-t_0$ a considerably smaller force $F_{LL}$ will be measured or monitored by the force detector 9.

Thus, a large leak LL is inventively already detected if the biasing member is moved at a predetermined rate or speed towards and onto the container wall and after a predetermined time span as of $t_1-t_0$ a predetermined force, as of $F_o$, is not reached.

Preferably such a behaviour of the container is already detected after a time span which is shorter than $t_1-t_0$, so as to become able to stop biasing of the container early enough and before pressing or suctioning a product contained in the container to and into its surrounding. Thus, preferably, there is installed a shorter time span $t_{LL}-t_0$ and after this time span of increased biasing it is checked whether a predetermined threshold force, according to FIG. 4 as of $F_{LL}$, is reached or not. If it is not reached according to the biasing course (b) further biasing is stopped and the heavily leaky container is freed of any bias as quickly as possible.

If the container 1 is not heavily leaky, the reaction force monitored, F, will reach after the predetermined time span of increasing biasing, $t_1-t_0$ the threshold value as of $F_o$ as required and leakage behaviour of the container will only be detected afterwards.

After having checked for large leaks LL and having disabled further biasing of the container as at time $t_1$, preferably a predetermined time span $t_2-t_1$ up to $t_2$ is installed, during which the system consisting of container 1, biasing member 5 and force detector 9 is left for attaining equilibrium e.g. of the shape of the container.

Thereby, in a preferred mode, $t_2$ is set on the maximum value according to $t_{max}$, thus there is valid $t_2=t_{max}$. This is especially done if the container under test does not experience e.g. a volume change under the stress of the bias, which leads to a decrease of reaction force in a transient phase which decrease is not due to leakage.

At or after reaching $t_2$ the monitored reaction force F, then prevailing, $F_2$, is sampled and stored. After lapse of a further time span $t_3-t_2$ up to $t_3$ again the monitored reaction force F is sampled as $F_3$ and is compared with reaction force $F_2$ as was stored. Thus, the difference $\Delta F$ of $F_3$ and $F_2$ is principally evaluated as leak indicative signal.

Figure 4:
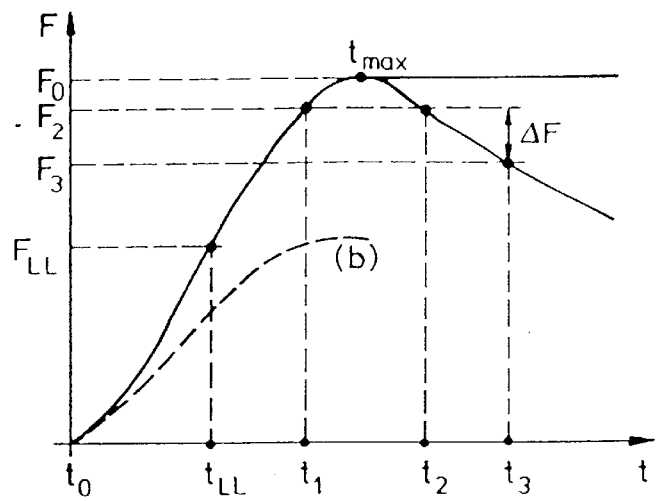
FIG. 4 a qualitative force versus time diagram explaining the inventive method as performed by an inventive apparatus.

As further shown in FIG. 4 it is also possible to sample and store force $F_2$ on the rising slope of biasing the container 1 and to wait for the force F monitored to re-reach in the falling slope of F, after having stopped further biasing—$t_1$—the value according to $F_2$, thereby indicating that the system has in fact stabilized. In this case time moment $t_2$ will be defined by the force F as monitored re-reaching the preset and stored value $F_2$.

Figure 5:
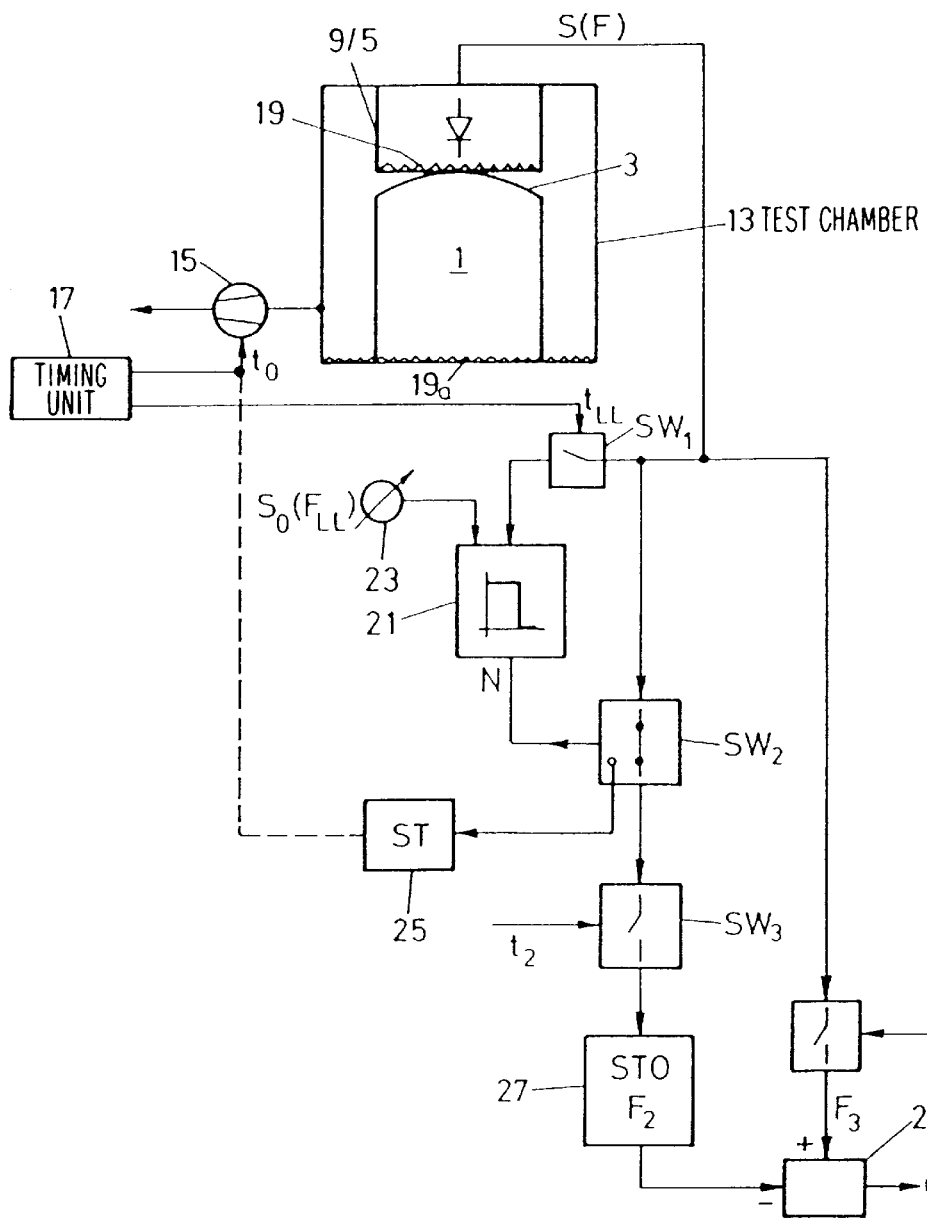
FIG. 5 by means of a schematic and simplified functional block/signal-flow diagram, an embodiment of the inventive apparatus operating according to the inventive method.

In FIG. 5 the inventive apparatus in its principle form which performs the procedure as explained with the help of FIG. 4 is schematically shown. Thereby, the same reference numbers are used as in the previous figures with respect to features already described. In the test chamber 13, which is vacuum tight, the container 1 to be tested is deposited. The vacuum pump 15 is operated controlled by a timing unit 17. Pump 15 evacuates chamber 13 preferably at a constant and adjustable rate.

Combined biasing member and force detector 9/5 is rigidly mounted within chamber 13 and preferably opposite and adjacent to the area 3 of flexible wall of container 1. The force detector 9 generates electrical signal S(F) as a function of the force acting between area 3 and contact area of the biasing/force detector assembly 9/5, which is as schematically shown provided with a surface structure 19 to prevent that surface shutting a leak of area 3 incidentally just happening to be located there, where area 3 is or is going to contact the assembly 9/5. The same structuring 19a is preferably provided at the bottom surface of chamber 13.

The signal S(F) is fed at a time $t_{LL}$, controlled by timing unit 17 as schematically shown and by switch unit $SW_1$, to a comparator unit 21, where at time moment $t_{LL}$ the output signal S(F) is compared with the large leak indicative threshold value $S_0(F_{LL})$ as preset at unit 23.

Whenever at moment $t_{LL}$, $S_0(F_{LL})$ is not reached by the force signal S(F), switching unit $SW_2$, the input thereof being connected to S(F), is opened disabling via a control unit 25 further biasing e.g. by pump 15. If the threshold value $S(F_{LL})$ is at least reached by S(F) at the moment $t_{LL}$, then signal S(F) is led to a further switching unit $SW_3$, where, controlled from timing unit 17 at moment $t_2$, the prevailing signal is in fact sampled and stored in storing unit 27. Thus, in unit 27 there is stored a value according to force $F_2$ of FIG. 4. The output of the storing unit 27 is fed to a comparing unit 28, to which, again controlled from timing unit 17, at moment $t_3$ signal S(F) is additionally fed according to the then prevailing value $F_3$. Thus, comparing unit 28 compares the force value at moment $t_2$ with the value of that force prevailing at moment $t_3$. The output $\Delta F$ of comparator unit 28 is indicative of leak behaviour of container 1 under test beside of a large leak prevailing, which has been previously detected.

Instead of evaluating directly the output signal of comparator unit 28 it is possible to control biasing as a function of the output signal of comparator unit 28. Thereby, a negative feedback control loop is installed (not shown), wherein the comparator unit 28 compares a rated value according to the stored signal in storing unit 27 with an instantaneously prevailing signal, S(F) and as an adjusting unit in the negative feedback control loop a biasing member is operated to minimize the output signal of comparator unit 28. Thereby, the control signal of such biasing member 15 is exploited as leak indicative signal.

Figure 6:
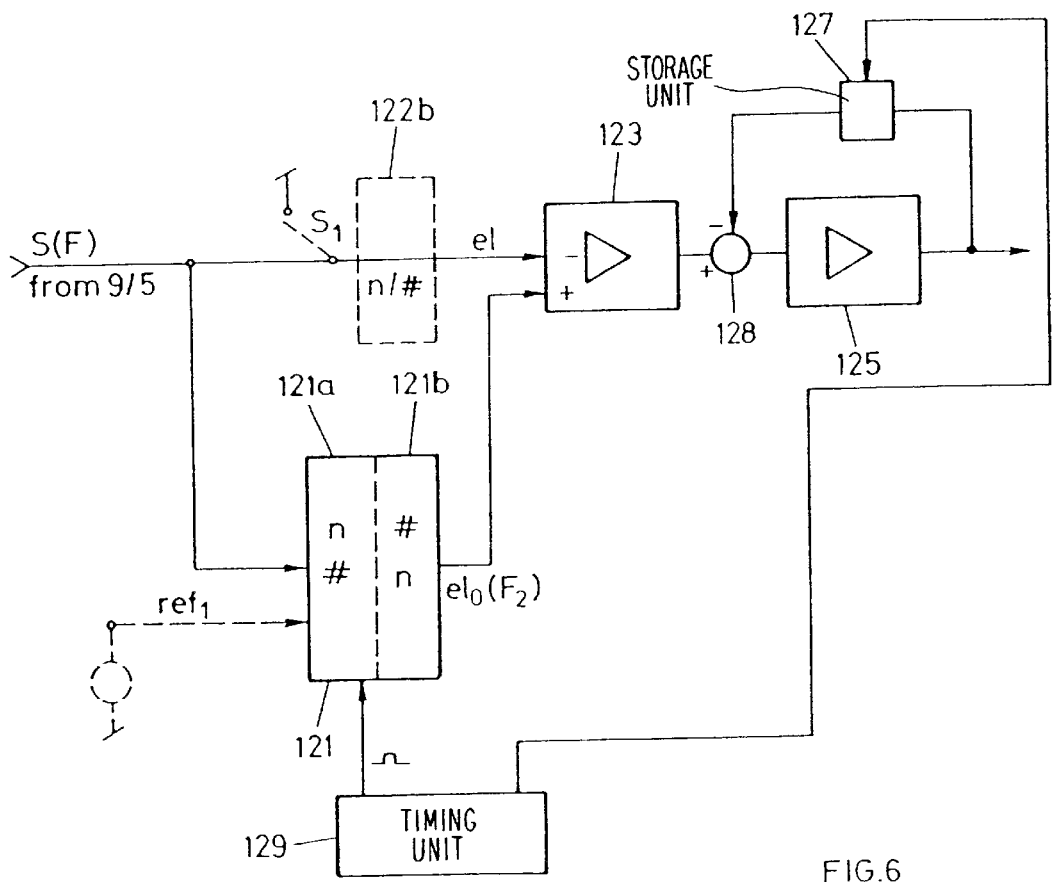
FIG. 6 schematically and in a simplified form a preferred realisation of storing and comparing units as preferably used in the inventive apparatus.

In FIG. 6 a most preferred realisation of storing unit 27 and comparator unit 28, schematically shown in FIG. 5, is depicted.

The output signal of the force detector 9 in assembly 9/5 is input to a conversion unit 121, which comprises, as an input stage, an analogue to digital converter 121a, followed by a digital to analogue converter 121b. The output of the converter stage 121 is fed to a difference amplifier unit 123, which additionally receives directly the output signal from force detector 9. The output of the difference amplifier 123 according to the comparator unit 28 of FIG. 5, acts on a further amplifier unit 125, the output of which being superimposed at 128 to its input via storage unit 127. The input of the storage unit 127 is fed from the output of unit 125. A timer unit 129, as timer unit 17 of FIG. 5, controls the arrangement. For storing the signal according to the force value $F_2$ as of FIG. 5, at time $t_2$ the timer unit 129 enables a conversion cycle at unit 121, so that a reconverted analogue output signal $el_o(F_2)$ appears at the analogue output.

Simultaneously the substantially same signal S(F) from force detector 9 is applied as a signal $el(F_2)$ to the second input of unit 123. Thus, at the output unit 125, a zero signal should appear. Nevertheless, in general a zero offset signal will appear at the output of unit 125, which signal is stored in the storing unit 127, enabled by the timing unit 129, according to unit 17 of FIG. 5. At time $t_3$ (FIG. 5) no conversion is triggered at the unit 121, so that there appears at the input of amplifier 123 directly from force detector 9 the signal according to the force value $F_3$ prevailing at $t_3$, and from stage 121 the stored signal according to force value $F_2$, which was prevailing at $t_2$. Further, the zero offset signal, which was stored to unit 127, is now superimposed as an offset compensating signal to the output of unit 123, so that the resulting signal at the output of amplifier unit 125 is zero offset compensated. This allows a very accurate measurement of the force difference $\Delta F$ as of FIG. 4.

When looking at either of the FIGS. 1, 2 or 3 it becomes clear that even if vacuum is used to bias the container's wall towards and onto the force detector, the volume of the test chamber 13 is not very critical with respect to the volume of the container to be tested. Whereas in evaluating a pressure as is done in prior art leak testers, here inventively a force is evaluated. When evaluating a pressure as e.g. the pressure prevailing in the surrounding of a container to be tested, then accuracy of measurement is largely dependent on the remaining volume between the wall of the test chamber and that of the container, because leakage will affect the pressure in that intermediate volume the more the smaller than said intermediated volume is selected. According to the present invention by providing biasing a wall portion of the container a wall portion of the container is urged against the force detector. Leakage to the surrounding will affect such force irrespective of the surrounding volume and thus of the relative volume of the test chamber with respect to the container to be tested.

Nevertheless, under the aspect of shortening testing cycles it is recommended to provide testing chambers which are minimum in volume with respect to the containers to be tested therein, if biasing is performed by vacuumising according to FIG. 3.

By selecting the established biasing according to $F_o$ of FIG. 4 and thereby the force and thus signal S(F), the level of measuring is set and may be selected. As the flexible wall portion in its bowing action will reside along a successively larger contact area on the force detector and/or the biasing member with an eye on the embodiment of FIG. 3, establishing a larger biasing pressure difference $\Delta p$ will lead to an overproportionally rising biasing force F. This accords to an amplification of the signal $\Delta F$ according to FIG. 4 to be exploited. This again significantly improves accuracy of the overall measuring system and makes it easy to establish the range of evaluation signals.

Figure 7:
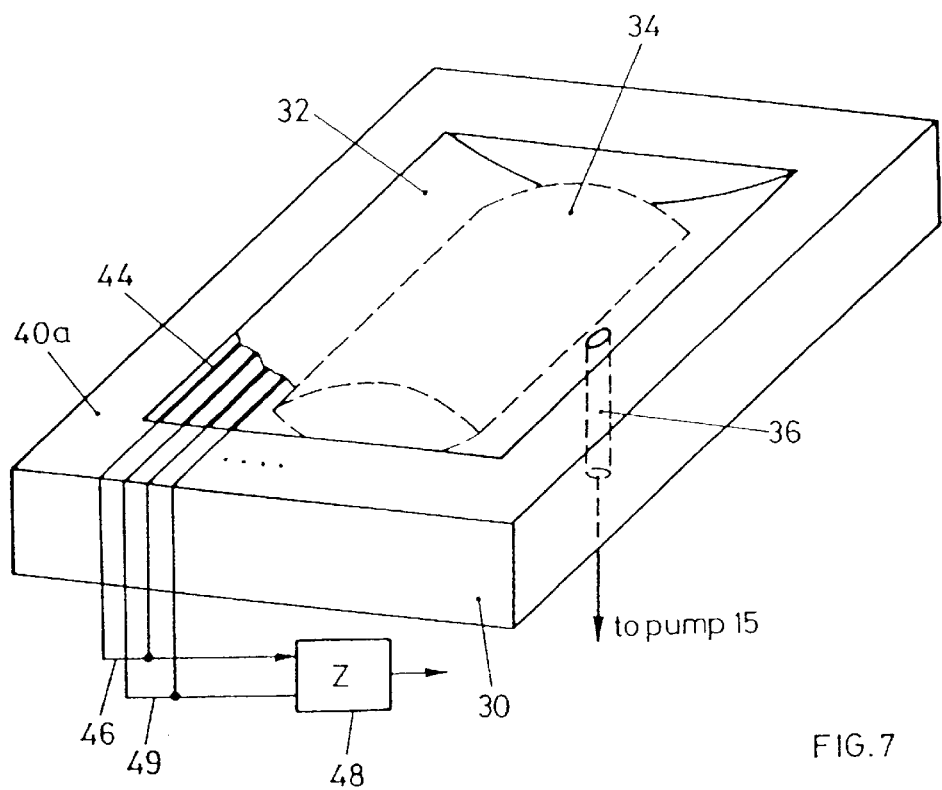
FIGS. 7 and 8 schematically and in a perspective view, a test chamber for realising the invention as shown in FIG. 3 and for testing pouches.
Figure 8:
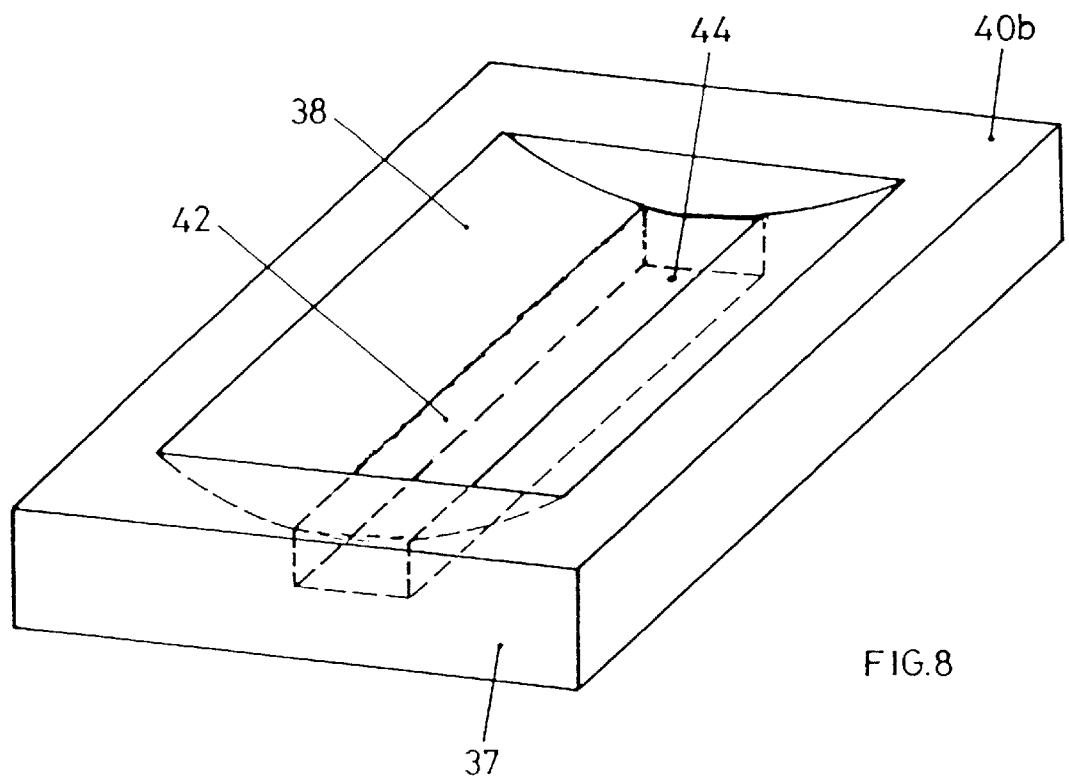

In a preferred embodiment operating according to FIG. 3 pouches filled with a product are tested. In FIGS. 7 and 8 there is shown, in a simplified representation, two halves of a test chamber or test cavity according to chamber 13 of FIG. 3, tailored for testing pouches.

According to FIG. 7 there is provided in a basis 30 a recess 32 substantially shaped according to pouch 34 (dashed lines) to be tested therein. For instance in the base plate 30 there is applied one or more than one suctioning line 36 to be connected to an evacuating pump according to pump 15.

The top plate 37 as of FIG. 8, which is conceived similarly to the bottom plate 30, has a recess 38, which, once the top plate 37 is deposited upon the base plate 30, defines with recess 32 the test chamber or test cavity. The bottom surface 40b and the top surface 40a of the two plates 30 and 37 do snugly and vacuum tightly fit and are thereby, if necessary, provided with respective sealing members all around the recesses 32/38. In one (or possibly in both) of the plates 30, 37 there is installed a force detector arrangement 42 with a large detection surface 44 fitted to the shape of the test cavity. The force detector arrangement 42 preferably operates on the principle of resistance gauge, i.e. pressurising the surface 44 will generate a force according to pressure multiplied by contact surface, which will slightly bend the resistance gauge element, thereby generating the electric signal S(F) according to FIG. 5.

Nevertheless, other force detectors operating on different physical principles may clearly be used, thereby preferably force detectors, which operate on minimum mechanical movement. Thus, e.g. a piezo force detector may be used.

Especially when the test cavity as formed by the two recesses 32 and 38 of FIGS. 7 and 8 for testing pouches is made to snugly fit the shape of a container 1 (a pouch) to be tested therein, it is possible to get additional information especially about large leaks by measuring the electric impedance outside the container under test, which is changed whenever e.g. a liquid content of a leaky container is urged or suctioned out of such container. As shown only in the bottom plate 30 of FIG. 7 and not in the top plate 37 of FIG. 8, the inner surface of the test cavity may be subdivided in electrically conductive electrodes 44. Every second electrode 44 is connected to one input connector 46 to an impedance measuring unit 48, every electrode in-between to input connector 49. Impedance measuring unit 48 may measure AC and/or DC impedance, preferably DC impedance. Thus, whenever the container, as pouch 34, is biased and a liquid or pasty content is pressed into the test cavity, irrespective of large leak measurement according to FIGS. 4 and 5 as was discussed above, a change in impedance measured at the unit 48 will indicate such a leak, and the output signal of the impedance measuring unit 48 will stop further biasing of the container.

For cleaning a test cavity e.g. in case content of a leaky container has been pouring out into the test cavity, further (not shown) lines or pipes may be provided abutting in the test cavity and connected to liquid and/or gaseous cleaning media as to a source of air or, and preferably, nitrogen and/or of pressurised liquid flushing medium and further (not shown) a heater may be incorporated into the walls of the test cavity to dry and additionally clean a spoiled test cavity.

A most important feature, which is preferably provided irrespective whether the system operates according to FIG. 1 or 2 or according to FIG. 3, shall now be described with the help of FIGS. 9 and 10.

Figures 9, 10:
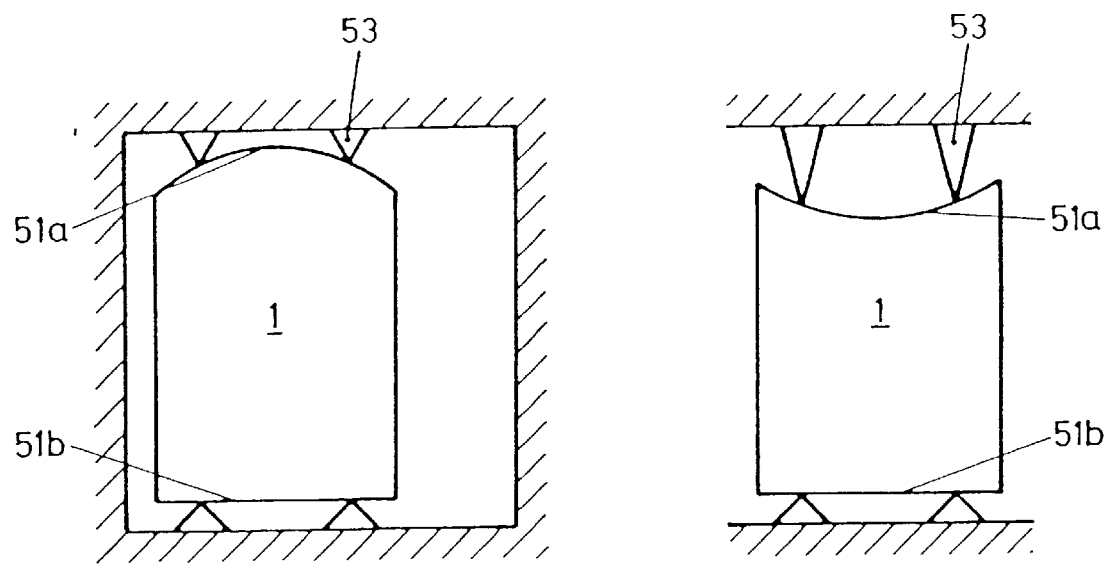
FIGS. 9 and 10 schematically, further preferred features at a test cavity operated according to FIG. 3.

Whenever a container 1 to be tested is biased, be it according to the teaching of the FIG. 1 or 2, to which FIG. 10 is directed or according to FIG. 3, to which FIG. 9 is directed, at least two wall portions of the container, which are disposed one opposite the other, denoted in the FIGS. 9 and 10 as 51a and 51b, will be firmly pressed onto the biasing member/force detector arrangement or more generically to surfaces. Whenever there happens a leak to be in such an area of container's wall, such a leak might be clogged by such a surface. Therefore and as schematically shown in FIGS. 9 and 10 there is provided at all surface areas to which, during biasing the container, a wall area thereof is pressed, a surface structure, so that such a surface does only contact the wall of the container 1 at distinct contact areas, leaving substantial parts of such wall portion uncontacted. This may be realised by providing a mesh- or grid-like member between the respective surfaces and wall portions of container 1 or by roughening such surfaces by machining such as by etching or sand-blasting. Mechanical abutments 53 as schematically shown in the FIGS. 9 and 10, which contact respective distinct areas of container's wall are formed by such microstructuring of the respective surface. With an eye on the embodiment according to FIGS. 7 and 9 it is therefore recommended to have the surface of the respective plates 30 and 37, which form the recesses 32 and 38, mechanically machined to have a roughened microstructure. Thereby, it is prevented that any leak in the wall of the container may be clogged by the wall area of the container having such leak being urged onto a surface of the system, be it the biasing member surface, the force detector surface or another part of the test cavity's surface.

Figure 11A:
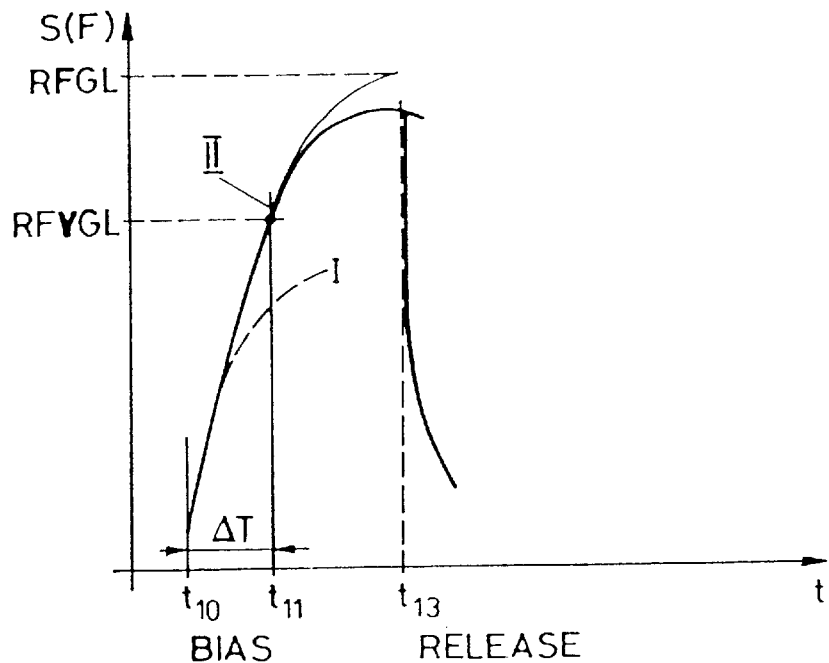
FIGS. 11a to 11c force-signal versus time diagrams showing a preferred realisation form of the inventive method by an inventive apparatus.
Figure 11B:
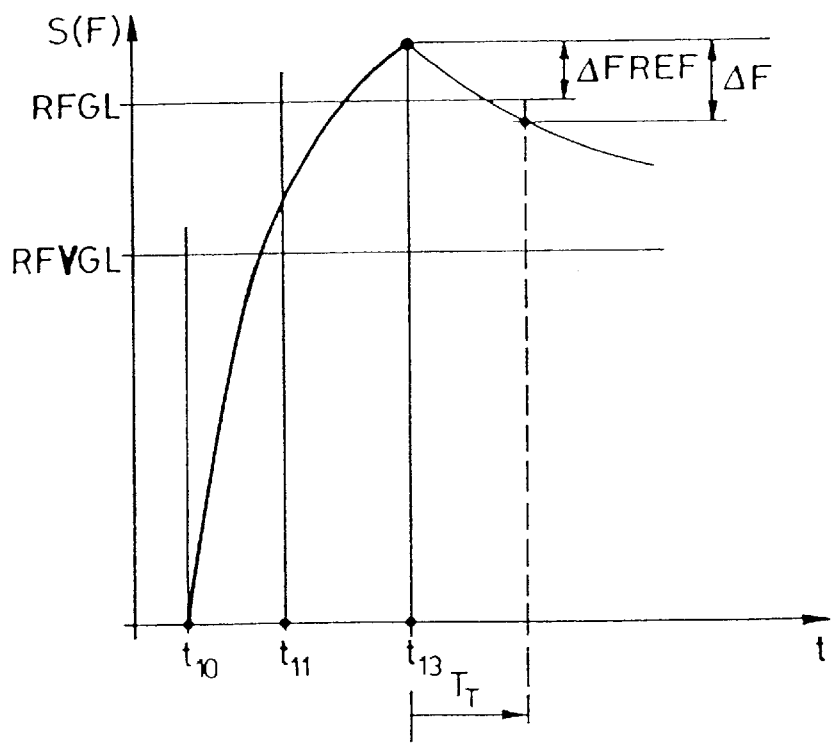
Figure 11C:
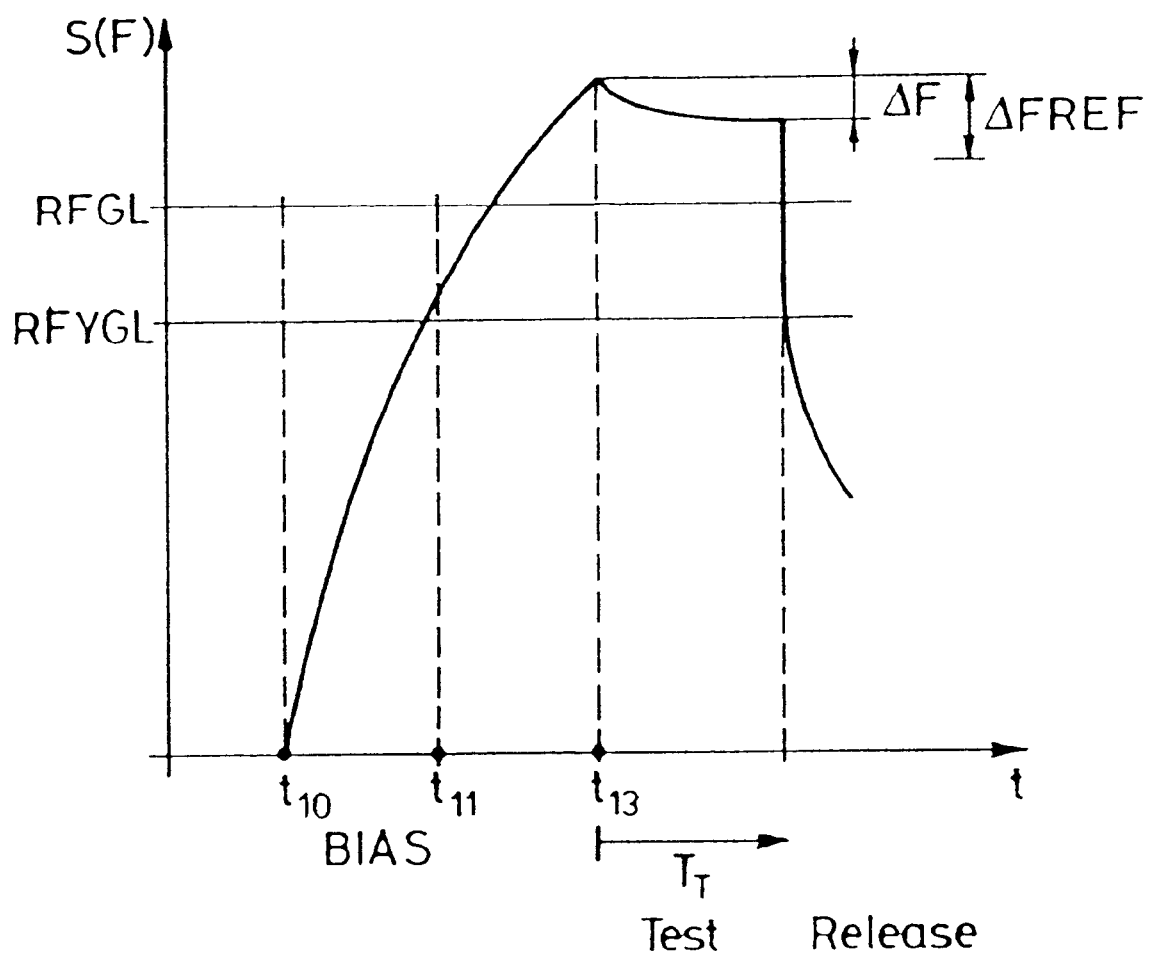

Force versus time courses as measured according to the inventive method and with an inventive apparatus in preferred mode are shown in FIG. 11a for very large and large leaks VGL, in FIG. 11b for small leaks and for unleaky containers in FIG. 11c. These FIGS. shall be discussed in connection with FIG. 12, which shows a preferred monitoring and control unit.

According to FIG. 11a the timing unit 201 of FIG. 12 initiates at time $t_{10}$ biasing of a container 1 under test, be it according to the embodiment of FIG. 1 or 2 or 3. According to the embodiment of FIG. 3, thus the timing unit 201 initiates evacuation of the test cavity 13.

This is shown in FIG. 12 by the biasing start signal BIST/$t_{10}$.

After a fixed predetermined amount of time $\Delta T$ the output signal of the force detector S(F) becomes compared with a first reference signal preset at a presetting source 107, RFVGL. To this target, comparator unit 109 is enabled by timer unit 201 at $t_{10}+\Delta T$.

If after time span $\Delta T$ the actual monitored force according to the electric signal S(F) of FIG. 12 has not reached the value of RFVGL according to course I of FIG. 11a, this means that a very large leak VGL is present. This is detected at comparator 109 generating the output signal VGL. If according to the characteristics shown in the block 109 of FIG. 12 the output signal of this comparator unit enabled at $t_{11}=t_{10}+\Delta T$ is e.g. still at a high value, indicating presence of a VGL, this is output at the VGL output. If the biasing force F has reached and crossed the reference level RFVGL according to course II of FIG. 11a the VGL output signal is not generated.

The VGL signal preferably stops the biasing cycle, because this would lead just to pressing content of the container under test into the surrounding.

As shown by the course II of FIG. 11a as VGL does not occur, biasing of the container under test continues up to a further moment of time $t_{13}$. At the time $t_{13}$ the timer unit 201 disables biasing drive, be it the mechanical drive 7 according to the embodiments of the FIGS. 1 and 2, or the evacuation pump 15 as of the embodiment of FIG. 3.

Further, position of timer unit 201 enables comparator unit 111, to which a further reference value RFGL is led, generated by a reference signal source 113. If at time $t_{13}$ the force detected by the force detector has not reached RFGL, then comparator unit 111 generates an output signal GL indicating that the container under test has a large leak GL. Here again, some reactions are taken with respect to further operation of the testing system.

If either of the signals VGL or GL are initiated by the respective comparators 109, 111 the timer unit 201 is principally reset because the testing has been completed and the quality of the instantaneously tested container 1 established has been identified. This is schematically shown in FIG. 12 by the signal $RS_{201}$. If not reset shortly after $t_{13}$ the value $S(F)(t_{13})$ of the force detected by the force detector is stored in a holding or storing unit 117. The output of the holding or storing unit 117 is led to one input of the difference forming unit 119, whereas the second input of this unit 119 is connected to the output S(F) of the force detector. After a presettable test cycle time $T_T$ starting at $t_{13}$ or at the moment of storing data in storing unit 117, as schematically shown by unit 121 of FIG. 12 the force difference $\Delta F$-signal is fed to a further comparator unit 125 enabled at the lapse of testing time $T_T$.

By means of a further reference value source 127 the reference value $\Delta$FREF is fed to the comparator unit 125. As will be explained later the value of $\Delta$FREF may controllably be varied in time and/or a reference value $\phi_R$, to which $\Delta$FREF is referred to, may also controllably be varied in time.

If the $\Delta F$-signal at time $t_{13}+T_T$ is larger than the reference value $\Delta$FREF, then a signal FL is generated at unit 125, indicating presence of a fine leak FL in the container 1 under test. This according to the situation as shown in FIG. 11b. If the $\Delta F$-signal does not reach $\Delta$FREF then the container is considered unleaky, as none of the signals VGL, GL and FL has been generated. This accords with FIG. 11c.

If the VGL signal is generated according to FIG. 12 irrespective of the embodiment according to one of the FIGS. 1, 2 and 3, further biasing is immediately stopped. In the embodiment of FIG. 3 making use of an evacuation pump 15 as a biasing drive, the evacuation pump 15 is immediately disconnected from the respective testing chamber 13. This because by a very large leak the vacuum pump 15 could become contaminated by leaking content of the container 1.

In a multiple chamber inline testing system making use of the embodiment of FIG. 3 with a multitude of testing chambers occurrence of the signal GL—indicating a large leak—and possibly even the occurrence of the signal FL—indicating for a fine leak—leads preferably to disabling or "bypassing" that chamber from further being supplied with containers to be tested, whereas the other chambers are still operating and performing tests on newly supplied containers.

This bypass of a testing chamber 13, whereat a container has been identified as heavily or even slightly leaking, is performed so as not to influence further testing results at that chamber and especially not to spoil the vacuum pump 15 connected thereto due to content of the leaky container being suctioned towards and into such pump. This bypass chamber is reconditioned during further testing cycles at the other chambers after the leaky container having been removed.

Reconditioning may be done by heating that chamber 13, flushing it by a liquid and/or a gas, preferably nitrogen, especially by a heated gas.

When looking to the FIGS. 11a and 11b it may be recognised that setting the reference value RFGL and especially setting of the reference force difference value $\Delta$FREF may be very critical and may largely influence accuracy of the system. Thereby, influences as surrounding temperature, tolerances of container manufacturing etc. may influence the prevailing force course and lead to false results if these critical reference levels and especially $\Delta$FREF are set for utmost accuracy.

In FIG. 13 there is qualitatively shown the biasing force course according to the courses of FIGS. 11a to 11b, but measured at containers of the same type which have been proven as unleaky. This may have been done by long-term experiments and/or leak detecting systems, which are standard and of utmost accuracy, but slow and/or very expensive.

At $t_{13}$ the force values measured at the tight containers are slightly different and define a statistic distribution as shown in FIG. 13. There results an average value $(RFGL)_m$. The value of RFGL as used at the comparator 111 of FIG. 12 or as used according to the FIGS. 11a to 11c is found in that an offset value $\Delta$RFGL is subtracted from $(RFGL)_m$. During ongoing operation on large series of equal containers, temperatures and manufacturing tolerances of such containers may vary. Such parameters may slowly change and may vary $(RFGL)_m$.

Figure 14:
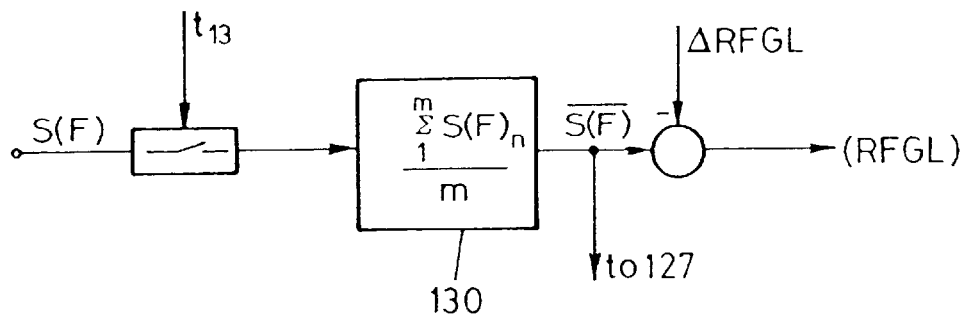
FIG. 14 a simplified functional block/signal-flow diagram showing a further preferred feature of the inventive apparatus and method for generating an adaptive threshold value at the embodiment according to FIG. 12.

Every time during multiple successive testing at the respective times $t_{13}$ up to which the respective container has been identified as not heavily leaky, the actual output signal of the force detector is entered into an averaging unit 130 as shown in FIG. 14, wherein the last m values of actual force of not heavily leaky containers are averaged. The output average result signal accords with $(RFGL)_m$ of FIG. 13, now varies in time e.g. due to varying manufacturing parameters of one and the same type of containers. To the output average result $\overline{S(F)}$ and according to FIG. 13 the offset ΔRFGL is subtracted, the result of this operation is a dynamically varying reference value RFGL, which is applied to comparator unit 111 of FIG. 12. This dynamically varying reference value RFGL is shown in FIG. 15 qualitatively, starting from an initial setting as e.g. found as was explained with the help of measurements at unleaky test containers.

Figure 15:
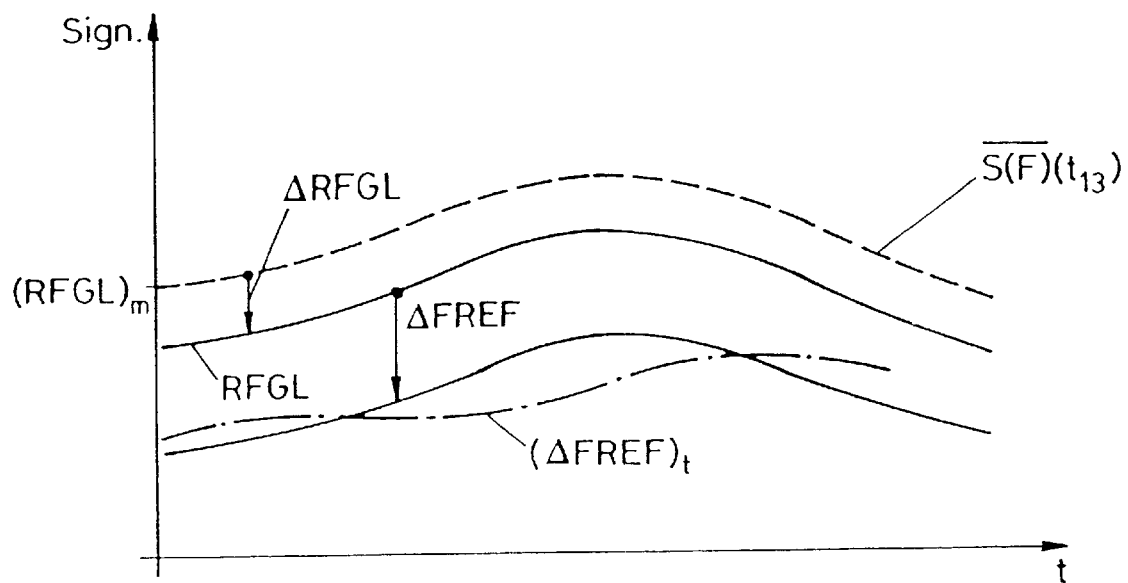
FIG. 15 over time, qualitatively time courses of adaptively varied threshold values of the inventive apparatus and method as realised by the embodiment of FIGS. 14 and 16, where

As may clearly be seen from FIG. 15 the average force value $\overline{S(F)}$ ($t_{13}$) is now the basis for also referring ΔFREF to. Therefore, and as is shown in FIG. 12, the force difference reference value ΔFREF is not referred to an absolute static value as $\phi_R$, but is referred to $\overline{S(F)}$.

Figure 16:
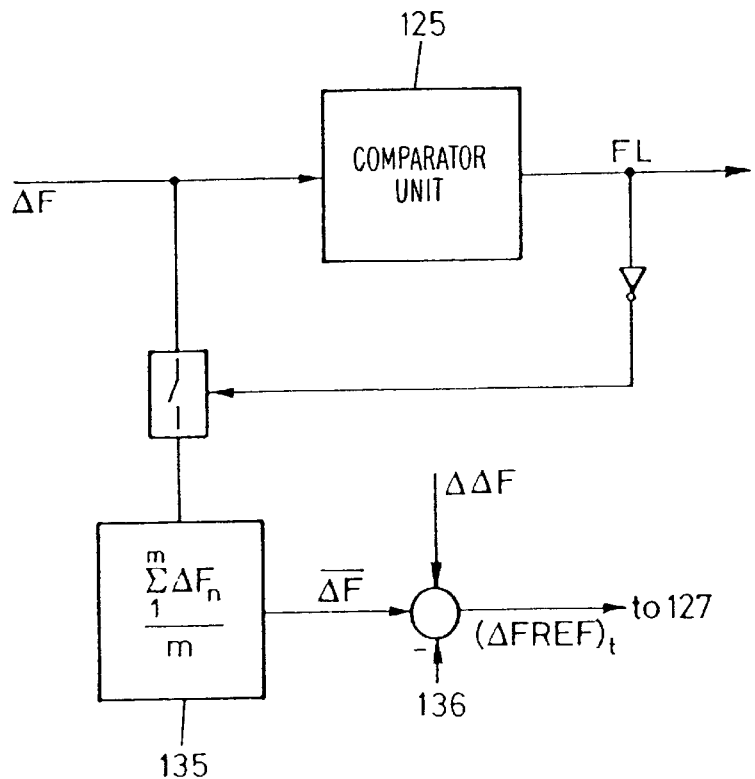
FIG. 16 shows an embodiment for adaptively adjusting a further reference or threshold value for the inventive method and as realised at the preferred apparatus, and FIG. 17 schematically shows an inline plant for inline assembling and testing containers.

An even further improvement of accuracy is reached, which may be realised separately or additionally to realising a dynamic RFGL and based thereon a dynamic upper limit of ΔFREF. Thereby and according to FIG. 16 at the end of the time span $T_T$ the actual force difference ΔF-signal is led to an averaging unit 135 whenever the output signal FL indicates that the container under test is unleaky. The output signal of unit 135, which accords to an average force difference signal $\overline{\Delta F}$ averaged over the last m test cycles is, offset by an amount ΔΔF, the result thereof being used as time varying ΔFREF-signal applied at unit 127 of FIG. 12.

Looking back on FIG. 15 whereat a constant ΔFREF signal was applied, the technique of averaging ΔF results as schematically shown with the course (ΔFREF)$_t$ in a dynamically varying value ΔFREF, varying according to variations of disturbing parameters influencing such force difference. It is clear that provision of a dynamically varying (ΔFREF)$_t$ signal according to that representation in FIG. 15 could be realised without providing a dynamically varying base value $\overline{S(F)}$ in referring (ΔFREF)$_t$ to a stable constant value $\phi_R$ as shown in FIG. 12 in dashed representation instead of referring to a dynamically varying $\overline{S(F)}$ value.

It is evident that preferably the evaluation of the output signal S(F) of the one or more than one force detectors is performed digitally.

Figure 17:
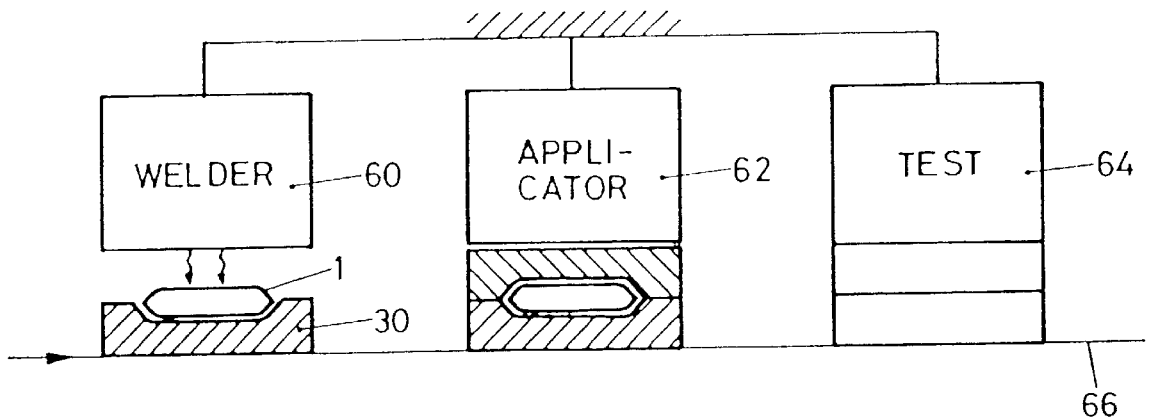

In FIG. 17 there is shown an inline plant, wherein generically assembling and testing of containers is done inline. As an example pouches are first welded at a welding station 60 in a base plate 30 as shown in FIG. 7 used as carrier and support for assembling. With the same carrier, namely base plate 30, after a pouch has been assembled therein by welding, the carrier formed by plate 30 is moved to an applicator station, where the top plate 37 as of FIG. 8 is assembled upon the bottom plate 30. Thereafter, the thus sealingly closed test cavity is moved and applied to a test station 64, where the inventive test is performed. The system of welder 60 and/or applicator 62 and/or tester 64 may thereby be stationary with respect to a conveyor 66 for base plate 30. Nevertheless, and depending on time requested for a certain operation, especially tester 64 may be moved together with conveyor 66 for a predetermined time, so as to become independent of speed of conveyor 66.

With the inventive method and apparatus there is provided a leak testing technique which is much less critical in achieving the same accuracy as with leak testing techniques evaluating pressure measurements. Biasing containers according to the present invention is much simpler than establishing a perfect vacuum around such container and measuring a biasing force considerably easier than accurately measuring the time development of a vacuum pressure surrounding the container. In vacuum measurement much more unknown and uncontrollable parameters may affect the measured entities, namely vacuum pressure, than in the here inventively exploited force measurement. Whereas setting of the measuring level in vacuum measurement technique greatly influences the expenditure for vacuum pumps, varying and setting a biasing force is of much less effort.

The inventive method and apparatus are especially suited for testing pouches, but clearly may be used for testing all kinds of containers up to big tanks as long as a wall portion thereof is flexibly bendable. The present invention may be realised at inline plants with a multitude of testing stations, e.g. arranged on a carousel with a very high throughput.

What is claimed is:

1. A method for manufacturing unleaky closed containers with at least one flexible wall area comprising:
   moving a biasing member relatively towards and onto said wall area;
   stopping said moving;
   monitoring a biasing force on said container;
   sampling said biasing force monitored at a first point in time, resulting in a first force measuring signal;
   sampling said biasing force monitored at at least one second subsequent point in time, resulting in a second force measuring signal;
   generating a difference signal in dependency of said first and second measuring signals as a leak indicative signal;
   sampling said biasing force monitored at a further point in time, resulting in a further force measuring signal and updating an average signal of further force measuring signals sampled during previous testings of unleaky containers with said further force measuring signal, if said leak indicative signal indicates an unleaky container and generating said difference signal in dependency of said averaging signal;
   rejecting a container indicated as leaky by said leak indicative signal.

2. The method of claim 1, further comprising selecting said further force measuring signal to be said first force measuring signal.

3. The method of claim 1, further comprising biasing said wall area up to a predetermined biasing.

4. The method of claim 3, thereby installing between the times of reaching said predetermined biasing and performing said sampling, a time span.

5. The method of claim 1, further comprising controlling said biasing as a function of said difference signal so as to hold said difference signal on a predetermined value and exploiting relative action of said biasing member as a leak indication.

6. The method of claim 1, further comprising performing said moving by establishing a pressure difference between the inside of said container and its surrounding.

7. The method of claim 6, further comprising establishing said pressure difference by evacuating said surrounding.

8. The method of claim 1, further comprising providing an area of surface areas contacted by the wall of said container as it is biased with a structure.

9. The method of claim 1, further comprising storing said first force measuring signal.

10. The method of claim 9, further comprising generating a difference signal at said first point in time from said first force measuring signal stored and said first force measuring signal, storing said difference signal as a zero offset signal and compensating zero offset of said generating a difference signal by said stored zero offset signal.

11. The method of claim 1, further comprising comparing said biasing force monitored with at least one predetermined threshold value at the latest time by the time of said sampling at said first point in time, said threshold value being dependent on said averaging signal.

12. The method of claim 1, further comprising comparing said difference signal with at least one predetermined threshold value.

13. The method of claim 1, further comprising storing said first force measuring signal by means of an analogue to digital converter enabled for conversion at said first point in time.

14. The method of claim 13, further comprising converting the digital output signal of said analogue to digital converter into an analogue signal and generating said difference signal with said reconverted analogue signal.

15. The method of claim 1, further comprising performing an impedance measurement at or at least adjacent to the wall of said container, preferably a resistance measurement with DC and enabling or disabling further moving of said biasing member towards and onto said wall area by the result of said impedance measurement.

16. The method of claim 1, further comprising monitoring said biasing force by means of a resistance gauge.

17. The method of claim 1, further comprising sampling said biasing force monitored at a third point in time not later than said first point in time, resulting in a third force measuring signal, comparing said third force measuring signal with a presettable threshold signal value and generating a large leak indication, if said third force measuring signal does not reach said threshold signal value.

18. The method of claim 1, further comprising providing a test cavity for said container and cleaning said test cavity after a container therein has been detected as leaky, said cleaning being performed by flushing with a gas, preferably with nitrogen, and/or by flushing with a liquid and/or by heating.

19. The method of claim 1, further comprising inline testing a series of said containers in a set of test cavities and further comprising the step of disabling testing in a test cavity for at least one testing cycle, if the container previously tested therein has turned out to be leaky to a predetermined amount.

20. The method of claim 1, further comprising
moving said biasing member towards and onto said wall area with a predetermined rate;
identifying for a large leak by monitoring said biasing force after a predetermined time of said moving and by monitoring whether said biasing force monitored has or has not reached a first predetermined threshold value.

21. The method of claim 1, further comprising moving said biasing member at a constant rate towards and onto said wall area.

22. The method of claim 1, further comprising shifting said average signal by a predetermined signal amount and generating said difference in dependency of said shifted average signal.

23. The method of claim 1, further comprising comparing said difference signal with at least one threshold signal.

24. The method of claim 23, further comprising updating a further average signal of difference signals generated during previous testings of containers with said difference signal, if said container under test is unleaky, and controlling said threshold value in dependency of said average signal.

25. A leak testing apparatus for leak testing a closed container with at least one flexible wall area, comprising:

a biasing arrangement for compressing or expanding a container under test;
a force detector applicable to the wall of a container under test and generating an electric output signal, the output of said force detector being operationally connected to a storing unit, the output of said storing unit being operationally connected to a comparator unit as a first input, the second input of the comparator unit thereof being operationally connected to the output of said force detector;
an averaging unit, the input thereof being operationally connected to the output of said force detector, the output thereof being operationally connected to a threshold unit as a first input, a second input of the threshold unit thereof being operationally connected to the output of said force detector.

26. The apparatus of claim 25, wherein said biasing arrangement comprising a pair of spaced apart members, said members being drivingly movable relative to each other towards and from each other.

27. The apparatus of claim 26, wherein said at least one force detector is mounted to one of said members.

28. The apparatus of claim 25, further comprising a sealingly closable test chamber connected to an evacuation pump, said force detector being rigidly mounted to said test chamber with a force-sensing surface exposed to the interior of said test chamber.

29. The apparatus of claim 25, wherein said force detector comprises a resistance gauge.

30. The apparatus of claim 25, further comprising a timing unit controlling storing at said storage unit at a first point in time and comparison at said comparing unit at a second point in time after said first point in time.

31. The apparatus of claim 25, wherein said storing unit comprises a analogue to digital converter.

32. The apparatus of claim 25, wherein said comparator unit comprises a difference input stage, the inputs thereof being operationally connected to the output of said force detector and to the output of said storing unit, the output of said input stage being operationally connected to a further storage unit, the output of said further storage unit being fed back towards the input of said comparator unit.

33. The apparatus of claim 25, further comprising an evacuatable test chamber and at least a pair of electrodes arranged within said test chamber and operationally connected to an impedance measuring unit.

34. The apparatus of claim 33, wherein surfaces of said test chamber contacting a container to be tested are provided with a surface structure.

35. The apparatus of claim 34, wherein said surface structure is formed by mesh or grid inlay or by a surface roughening machining of said surfaces.

36. The apparatus of claim 25, further comprising a first threshold-sensitive unit, one input thereof being operationally connected to the output of said force detector, the output thereof being operationally connected to a control input of the biasing arrangement.

37. The apparatus of claim 36, further comprising a second threshold-sensitive unit, the input thereof being operationally connected to the output of said force detector and comprising a timing unit enabling said first and second threshold-sensitive unit at different points in time.

38. The apparatus of claim 25, further comprising a further averaging unit, the input thereof being operationally connected to the output of said comparator unit, the output thereof being operationally connected to a threshold unit as a first input, a second input of the threshold unit being operationally connected to said comparator unit.

* * * * *